(12) United States Patent
Nagano et al.

(10) Patent No.: US 7,113,888 B2
(45) Date of Patent: Sep. 26, 2006

(54) PERFORMANCE PREDICTION PROGRAM AND PERFORMANCE PREDICTION SYSTEM FOR GROUND SOURCE HEAT PUMP SYSTEM

(75) Inventors: Katsunori Nagano, Sapporo (JP); Takao Katsura, Sapporo (JP)

(73) Assignees: Hokkaido University, Hokkaido (JP); Nippon Steel Corporation, Tokyo (JP)

( * ) Notice: Subject to any disclaimer, the term of this patent is extended or adjusted under 35 U.S.C. 154(b) by 0 days.

(21) Appl. No.: 11/084,762

(22) Filed: Mar. 18, 2005

(65) Prior Publication Data
US 2006/0064281 A1    Mar. 23, 2006

(30) Foreign Application Priority Data
Sep. 22, 2004    (JP) .............................. 2004-276099

(51) Int. Cl.
*G06F 19/00*    (2006.01)
(52) U.S. Cl. ...................................... 702/182; 374/100
(58) Field of Classification Search ................ 702/181, 702/182–185, 188; 374/100, 10, 12, 135, 374/141, 136, 142, 118
See application file for complete search history.

(56) References Cited

U.S. PATENT DOCUMENTS
4,379,483 A * 4/1983 Farley ........................ 165/261

FOREIGN PATENT DOCUMENTS
JP    2001-289533    10/2001

* cited by examiner

*Primary Examiner*—Edward Raymond
(74) *Attorney, Agent, or Firm*—Koda & Androlia

(57) ABSTRACT

A computer which functions by a performance prediction program for a ground source heat pump system of the present invention and a performance prediction system constructed thereby include a dimensionless distance calculating means, a first dimensionless time calculating means, a second dimensionless time calculating means, a boundary time acquiring means, an underground temperature change calculating means, and a tube surface temperature change calculating means. The performance prediction program and performance prediction system can be applied to the design of heat exchange system by obtaining predicted underground temperature data for the ground source heat pump system with high accuracy and predicting the performance for the ground source heat pump system based on the resulting underground temperature changes, etc., considering the use of a plurality of buried tubes, underground temperature change patterns for buried tubes placed at different intervals, and the use of U-shaped tube heat exchangers.

6 Claims, 12 Drawing Sheets

Single U-shaped tube

Double U-shaped tube

FIG.7

| | $d_U$[mm] | $d_{bo}$[mm] | $d_{iU}$[mm] |
|---|---|---|---|
| Calculation condition 1 | 32 | 120 | 20 |
| Calculation condition 2 | | | 30 |
| Calculation condition 3 | | | 40 |
| Calculation condition 4 | 32 | 100 | 20 |
| Calculation condition 5 | | 120 | |
| Calculation condition 6 | | 150 | |
| Calculation condition 7 | 32 | 120 | 20 |
| Calculation condition 8 | 20 | | 30 |
| Calculation condition 9 | 44 | | 40 |

FIG.8

| Calculation condition | Thermal resistance[mK/W] | |
|---|---|---|
| | Single U-shaped tube | Double U-shaped tube |
| 1 | 0.191 | 0.258 |
| 2 | 0.150 | 0.187 |
| 3 | 0.102 | 0.117 |
| 4 | 0.100 | 0.119 |
| 6 | 0.280 | 0.417 |
| 8 | 0.320 | 0.478 |
| 9 | 0.061 | 0.068 |

Single U-shaped tube

Double U-shaped tube

|  | Example 1 | Example 2 | Example 3 |
|---|---|---|---|
| Heating period | From October through May | | |
| Cooling period | From June through September | | |
| Amount of heat absorption in winter [GJ] | 33 | | |
| Amount of heat discharge in summer [GJ] | 3 | | |
| Amount of heat discharge in September and October [GJ] | — | — | Each 5 |
| Heat exchanger | Foundation pillar | Single U-shaped tube | Foundation pillar |
| Length and number | 8m × 20 | 80m × 2 | 8m × 20 |
| Diameter [m] | 0.175 | 0.12 | 0.175 |
| Interval [m] | 2 | 2 | 2 |
| Soil density [kg/m3] | 1500 | | |
| Soil specific heat [kJ/(kg·K)] | 2.0 | | |
| Coefficient of thermal conductivity [W/(m·K)] | 1.0 | | |
| Temperature of temperature-immutable soil layer [°C] | 10.4 | | |

FIG.14

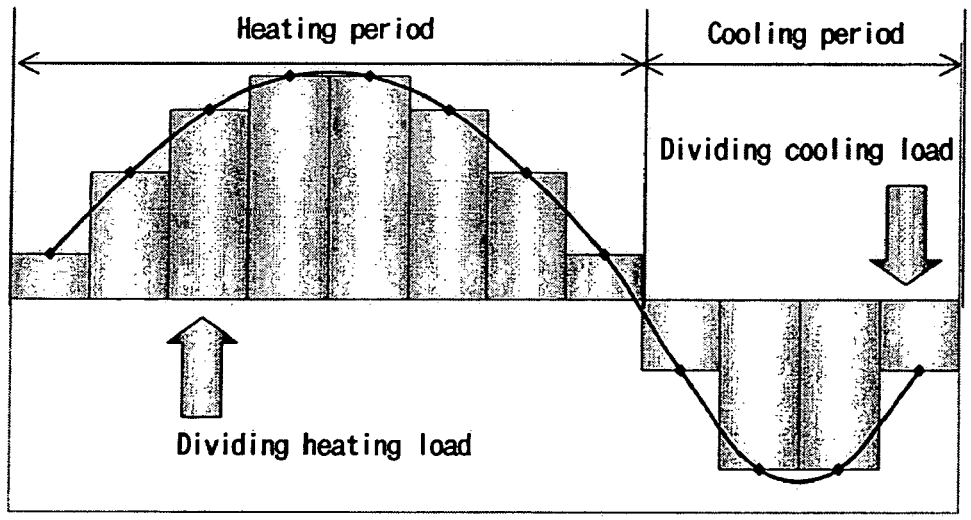

PERFORMANCE PREDICTION PROGRAM AND PERFORMANCE PREDICTION SYSTEM FOR GROUND SOURCE HEAT PUMP SYSTEM

BACKGROUND OF THE INVENTION

1. Field of the Invention

The present invention relates generally to a performance prediction program and performance prediction system for a ground source heat pump system using ground heat, and more particularly to a performance prediction program and performance prediction system which is suitable for use in performance prediction for a ground source heat pump system which employs a plurality of buried tubes or U-shaped tube heat exchangers as heat exchangers.

2. Description of the Related Art

Ground source heat pump systems, characterized by the use of renewable energy sources not affected by weather conditions and environmentally-friendly technology of no waste heat dissipation, have been attracting considerable attention. Under the circumstances, these systems are increasingly used, primarily in Europe and the United States. A conventional ground source heat pump system, as disclosed in Japanese Unexamined Patent Publication No. 2001-289533, comprises a U-shaped buried tube placed into a borehole in the ground as a heat exchanger and a heat pump mounted on the ground, in which an antifreeze is circulated through the buried pipe, to provide efficient heating and cooling by heat absorption and discharge with the ground.

Preferably, for installing the above mentioned ground source heat pump system with high installation costs, the heat exchanger has the dimensions, number of units and layout based on an individual and specific design to achieve high system performance, energy-saving and low-cost advantages. This conventional ground source heat pump system is prone, however, to several shortcomings. First, since conventional researches focus exclusively on the development of system structure to make the ground source heat pump more efficient, system evaluation techniques, in which performance for a proposed system can be predicted to provide a comprehensive equipment evaluation and thus improve system design, has not been established. Due to this shortcoming, conventional construction approaches have a problem of setting a higher safety factor, sorely based on previous construction experiences for system design and works execution.

Meanwhile, performance prediction for a ground source heat pump system requires a comprehensive equipment evaluation based on analytical data, such as system efficiency, power consumption, underground temperature, amount of carbon-dioxide emission, running costs and life cycle. There is another shortcoming of a difficult process for obtaining another basic data for such a comprehensive evaluation, underground temperature and its change. In a more specific manner, the use of a large number of buried tubes in a ground source heat pump system, aimed at promoting heat absorption and discharge between heat exchangers and the ground, will significantly affect underground temperature patterns by a long-term heat transfer, thereby causing a difficult calculation on its underground temperature change. Moreover, the impact of a plurality of buried tubes, by considering the alignment thereof at different intervals as well, on soil temperature change, must be examined.

For example, the use of a steel-pipe well type heat exchanger can facilitate heat transfer analysis due to a property thereof as a hollow circular cylinder. But, the above mentioned ground source heat pump system employs various shapes of heat exchangers such as single U-shaped tube and double U-shaped tube, thus it is hard to precisely calculate thermal resistance necessary for calculating system efficiency.

SUMMARY OF THE INVENTION

It is, therefore, one object of the present invention to solve the aforementioned problems by providing a performance prediction program and performance prediction system for a ground source heat pump system which can be applied to the design of heat exchange system by obtaining predicted underground temperature data for the ground source heat pump system with high accuracy and predicting the performance for the ground source heat pump system based on the resulting underground temperature changes, etc., considering the use of a plurality of buried tubes, underground temperature change patterns for buried tubes placed at different intervals, and the use of U-shaped tube heat exchangers.

The performance prediction program and performance prediction system for the ground source heat pump system of the present invention is characterized by performance prediction for the ground source heat pump system having a plurality of buried tubes as heat exchangers, a computer functioning by the program, the computer comprising:

a dimensionless distance calculating means which calculates a dimensionless distance (r*) by non-dimensionalizing a radial distance (r) from one of said buried tubes using the following expression (1);

$$r^* = \frac{r}{r_p} \quad \text{expression (1)}$$

where
$r_p$: radius of buried tube
r: radial distance from buried tube a first dimensionless time calculating means which non-dimensionalizes the following expression (2) using a dimensionless time t* (a non-dimensionalized elapsed time) (at/$r_p$) and a dimensionless temperature T* (a non-dimensionalized underground temperature) [λT/($r_p$·q)] when an underground temperature ($T_S$) for any distance (r) from a predetermined buried tube within an elapsed time (t) is given by said expression (2), and which calculates a first dimensionless time ($t_1$*) bounded by a zero segment in which said dimensionless temperature shows no change for said dimensionless distance and a linear increase segment in which said dimensionless temperature linearly increases for said dimensionless time;

$$T_s(r, t) = -\frac{2}{\pi \lambda_s} \int_0^\tau q(t) I(r, t) dt \text{ where} \quad \text{expression (2)}$$

$$I(r, t) = \int_0^\infty (1 - e^{-au^2 t})$$

$$\frac{J_0(ur)Y_1(ur_p) - Y_0(ur)J_1(ur_p)}{u^2[J_1^2(ur_p) + Y_1^2(ur_p)]} du$$

a: thermal diffusivity of the ground
q: heat flow on the surface of buried tube
$\lambda_s$: thermal conductivity of the soil
u: eigenvalue
$J_X$: the X root of the Bessel function of the first kind
$Y_X$: the X root of the Bessel function of the second kind a second dimensionless time calculating means which calculates a second dimensionless time ($t_2$*) bounded by a logarithmic increase segment in which said dimensionless temperature for said dimensionless distance logarithmically increases and said linear increase segment;

a boundary time acquiring means which obtains an elapsed time corresponding to said first dimensionless time as a first boundary time (t') and an elapsed time corresponding to said second dimensionless time as a second boundary time (t");

an underground temperature change calculating means which acquires said first boundary time and said second boundary time, and which calculates an underground temperature change at any point for a distance between buried tubes $r_d$ by the following approximate expression (3); and $$T_s(r,t) \cong T_s(r, t''-t') + T_s(r, t'-t'') \quad \text{expression (3)}$$
$$\cong -\frac{2}{\pi\lambda_s(t_2^*-t_1^*)}\int_{t_1^*}^{t_2^*} q\,dt^* - \frac{2}{\pi\lambda_s r^{*2}} T_s^* \Big|_{r^*=1}^{t^*=t_2^*}$$

a tube surface temperature change calculating means which calculates an underground temperature change on the surface of said buried tube by the summation of said underground temperature changes for respective buried tubes.

Preferably in this invention, said first dimensionless time calculating means acquires said first dimensionless time in an approximate manner based on the following approximate expression (4).

$$T_s^* \cong 2.8\exp(-1.73 t^{*-0.51} r^*) \quad \text{expression (4)}$$

Moreover, it is more desirable in this invention that said second dimensionless time calculating means acquires said second dimensionless time in an approximate manner based on the following approximate expression (5).

$$T_s^* \cong -\ln(r^*) + T_s^*|_{r^*=1} \quad \text{expression (5)}$$

Preferably in the present invention, if said heat exchangers are U-shaped tube heat exchangers, the heat flow on the surface of said buried tube, q is calculated based on the following expression (6).

$$q = K_p\big(T_s|_{r=r_p} - T_b\big) \text{ where} \quad \text{expression (6)}$$
$$K_p = \frac{1}{R_{ub}+R_{bo}} \qquad R_{ub} = \frac{1}{\pi}\left(\frac{1}{d_{u1}h_b} + \frac{1}{\lambda_u}\ln\frac{d_{u2}}{d_{u1}}\right)$$

$T_s|_{r=r_p}$: underground temperature on the surface of buried pipe
$T_b$: temperature of heating medium
$R_{bo}$: thermal resistance within borehole
$d_{u1}$: inner diameter of U-shaped tube
$d_{u2}$: outer diameter of U-shaped tube
$h_b$: convective heat transfer coefficient of heating medium
$\lambda_u$: thermal conductivity of U-shaped tube Accordingly, it is, of course, that even if heat exchangers for the ground source heat pump system comprise a plurality of buried tubes or U-shaped tube heat exchangers, this invention can precisely calculate an underground temperature considering such distinct system properties, and determine proper dimensions, number of units and layout for a heat exchanger by predicting the performance for the ground source heat pump system, based on underground temperature change patterns, etc.

BRIEF DESCRIPTION OF THE DRAWING

The above and other objects of the invention will be seen by reference to the description taken in connection with the accompanying drawings, in which:

FIG. 7 is a table describing the calculation conditions for calculating thermal resistance in the borehole of this embodiment;

FIG. 8 is a table describing the results of thermal resistance calculation under the calculation conditions as shown in FIG. 7;

FIG. 12 is an image diagram showing the data entry screen for the performance prediction program of this embodiment;

FIG. 13 is a table describing the calculation conditions for the examples 1 to 3;

FIG. 14 is a diagram showing amounts of heat absorption and discharge distributed by month for the examples 1 to 3.

DETAILED DESCRIPTION OF THE INVENTION

A preferred embodiment of a performance prediction system 1 executed by a performance prediction program according to the present invention will be described with reference to the accompanying drawings.

Figure 1:
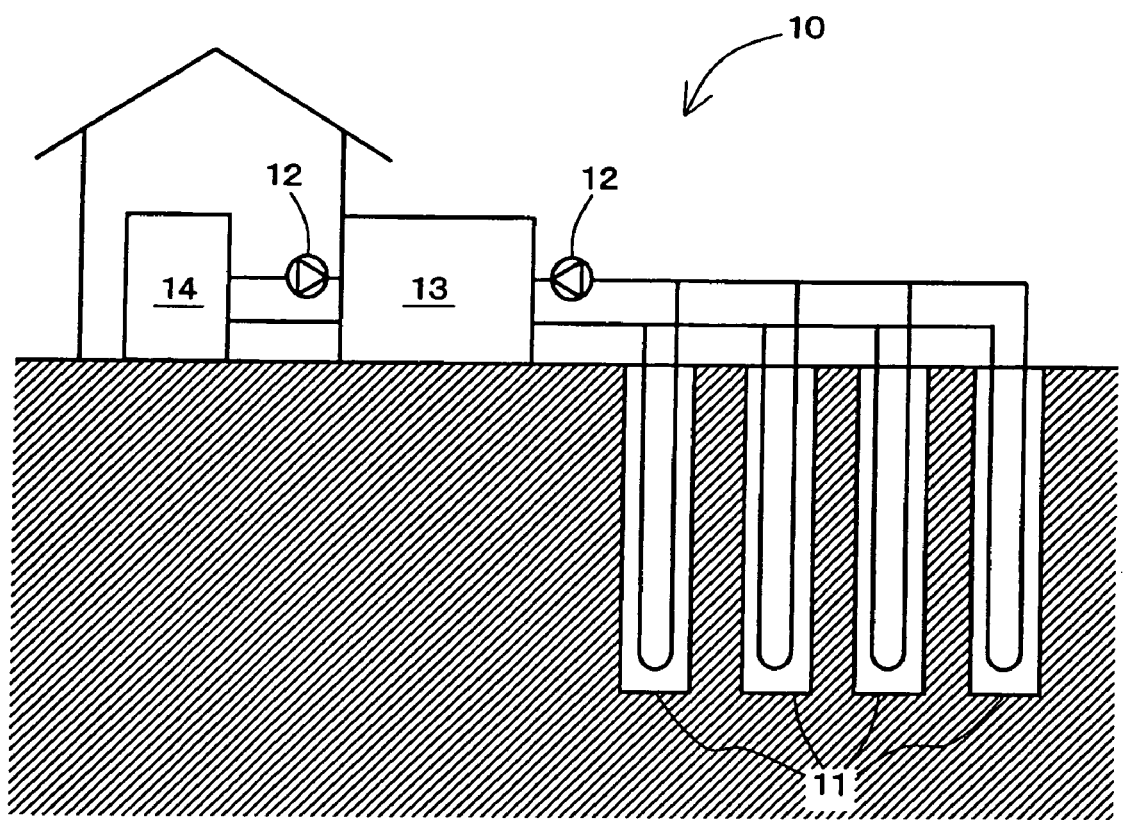
FIG. 1 is a schematic diagram of the structure of the ground source heat pump system according to the present invention.

FIG. 1 is a schematic diagram of this embodiment illustrating the structure of a ground source heat pump system 10 for performance prediction.

As shown in FIG. 1, the ground source heat pump system 10 comprises a plurality of buried tubes 11 as heat exchangers installed in the ground, a circulating pump 12 which circulates a heating medium through the buried tubes 11, a heat pump 13 which performs heat absorption and discharge with the ground through the heating medium circulated by the circulating pump 12, and an indoor air conditioner 14 which heats or cools the room through the heating medium being heated or cooled by the heat pump 13.

Figure 2:
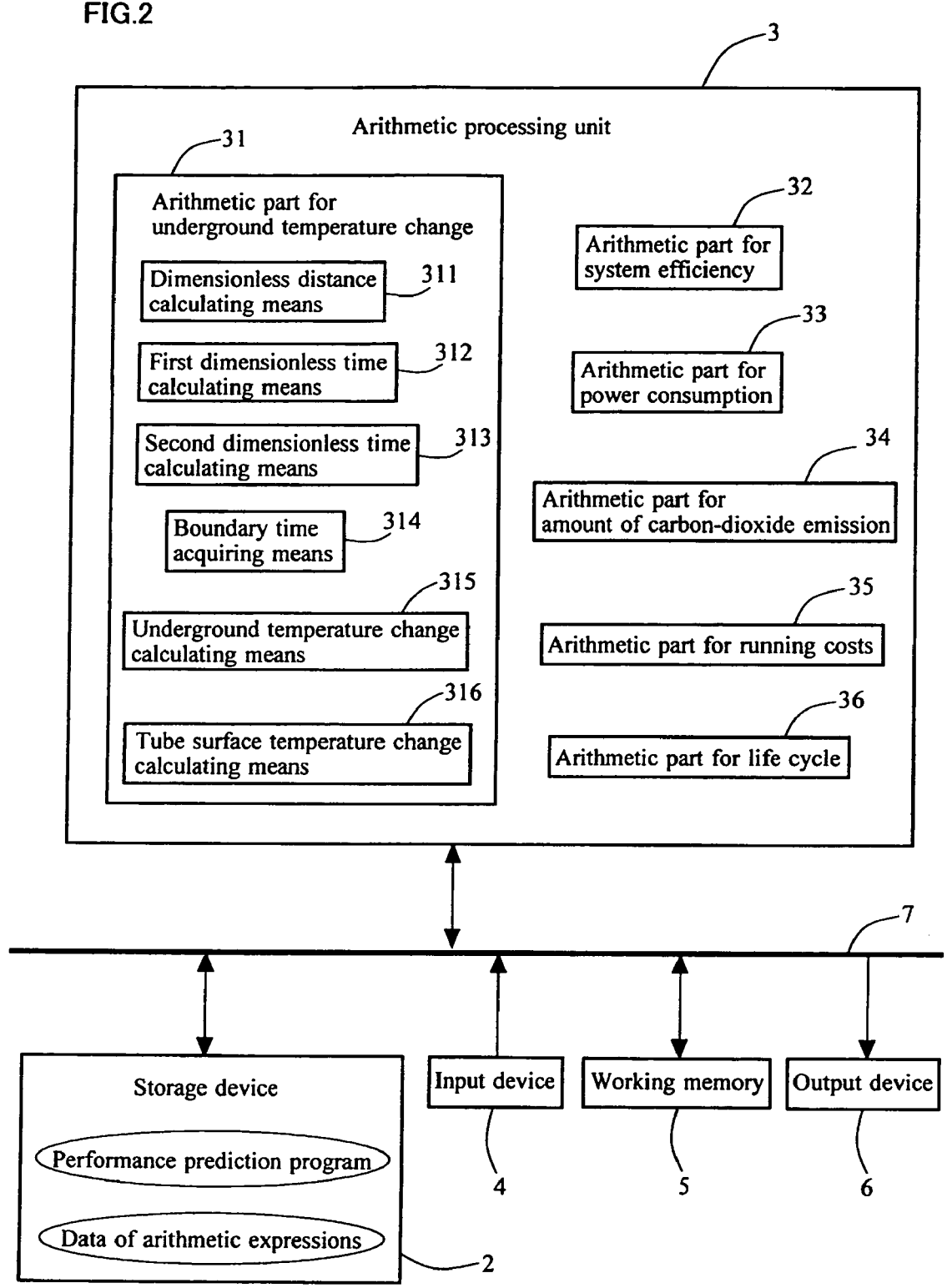
FIG. 2 is a block schematic diagram of the performance prediction system for the ground source heat pump system according to the present invention.

Next, the performance prediction system 1 of this embodiment will be explained referring to a block schematic diagram as shown in FIG. 2. The performance prediction system 1 of this embodiment, which calculates data necessary for predicting the performance for the aforementioned ground source heat pump system 10, essentially comprises a storage device 2 which stores the performance prediction program of this embodiment and arithmetic expressions, an arithmetic processing unit 3 which controls each component part thereof and performs arithmetic processing, an input device 4 to input data, a working memory 5 which temporarily stores data and serves arithmetic processing by the arithmetic processing unit 3, and an output device 6 which outputs the results of calculation, all of which are interconnected by a bus 7 for data communication.

Here, each component part of respective devices will be described in further detail. The storage device 2, which comprises, for example, read only memories (ROMs), stores the performance prediction program of this embodiment and data for arithmetic expressions.

The arithmetic processing unit 3 comprises central processing units (CPU) and other devices to control each component part of the performance prediction system 1 based on the performance prediction program stored in the storage device 2. As shown in FIG. 2, the arithmetic processing unit 3 of this embodiment comprises an arithmetic part for underground temperature change 31, an arithmetic part for system efficiency 32, an arithmetic part for power consumption 33, an arithmetic part for amount of carbon-dioxide emission 34, an arithmetic part for running costs 35 and an arithmetic part for life cycle 36 according to respective functions, which execute arithmetic processing to be described later.

Each component part of the arithmetic processing unit 3 will be described in further detail. The arithmetic part for underground temperature change 31, which calculates an underground temperature on the surface of the buried tube 11 in the aforementioned ground source heat pump system 10, comprises a dimensionless distance calculating means 311, a first dimensionless time calculating means 312, a second dimensionless time calculating means 313, a boundary time acquiring means 314, an underground temperature change calculating means 315 and a tube surface temperature change calculating means 316.

Figure 3:
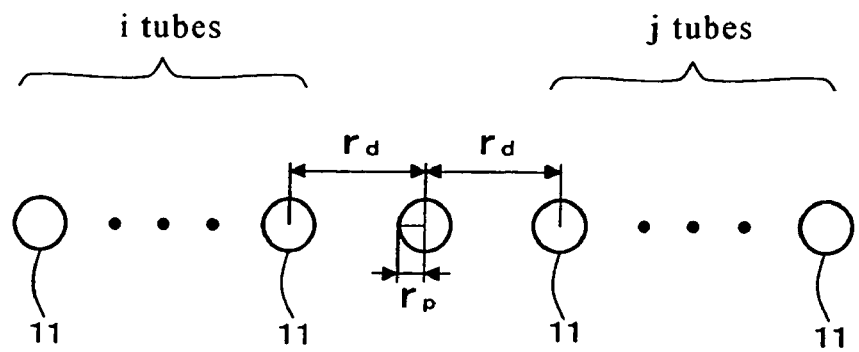
FIG. 3 is a diagram of this embodiment illustrating the alignment of a plurality of buried tubes.

Here, the calculation performed by each component means of the arithmetic part for underground temperature change 31 will be described in further detail. As shown in FIG. 3, the ground source heat pump system 10, having a predetermined buried tube 11, is provided with the same type of a plurality of buried tubes 11 (i tubes aligned in one direction and j tubes in the opposite direction). Supposing that a distance between the buried tubes $r_d$ is sufficiently larger than a radius of the buried tube $r_p$, an underground temperature $T_S$ on the surface of the predetermined buried tube 11 ($r=r_p$) within an elapsed time t is given by the following expression (7), using superposition principle in space for infinite cylinder.

$$T_s|_{r=r_p} = \frac{2q}{\pi \lambda_s} \left\{ I(r_p) + \sum_{n=1}^{i} I(n_{r_d}) + \sum_{n=1}^{j} I(n_{r_d}) \right\}$$ expression (7)

where $$I(r) = \int_0^\infty \left(1 - e^{-au^2 t}\right) \frac{J_0(ur)Y_1(ur_p) - Y_0(ur)J_1(ur_p)}{u^2[J_1^2(ur_p) + Y_1^2(ur_p)]} du$$

where q is heat flow on the surface of buried tube [W/m²], $\lambda_S$ is thermal conductivity of the soil [W/ (m·K) ], a is thermal diffusivity of the soil [m²/s], u is solution to eigenfunction necessary for calculating theoretical solution for thermal conduction, t is elapsed time [h], $J_X$ is the X root of the Bessel function of the first kind, $Y_X$ is the X root of the Bessel function of the second kind.

However, while the above theoretical expression (7) supposes the distance between the buried tubes $r_d$ is sufficiently larger than the radius of the buried tube $r_p$, the impact thereof on the underground temperature change for the distance between the buried tubes $r_d$ must be taken into account in the actual ground source heat pump system 10. More specifically, precise prediction of the underground temperature change requires the calculation of the underground temperature change at any point for the distance between the buried tubes $r_d$. The Laplace transform of a partial differential equation of thermal conductivity gives a theoretical equation describing heat flow response theory on the surface of an infinite cylinder as shown in the following expression (2). In this expression (2), by introducing a dimensionless distance $r^*$ ($=r/r_p$), a Fourier number $t^*$ ($=at/r_p$) and a dimensionless temperature $T^*[=\lambda T/(r_p \cdot q)]$ as dimensionless numbers for a radial distance r, the elapsed time t and the underground temperature $T_S$ respectively, a change in the dimensionless temperature $T_S^*$ for a change in the Fourier number $t^*$ at the predetermined dimensionless distance $r^*$ is given.

$$T_s(r,t) = -\frac{2}{\pi \lambda_s} \int_0^t q(t) I(r,t) dt$$ expression (2)

where $$I(r,t) = \int_0^\infty \left(1 - e^{-au^2 t}\right) \frac{J_0(ur)Y_1(ur_p) - Y_0(ur)J_1(ur_p)}{u^2[J_1^2(ur_p) + Y_1^2(ur_p)]} du$$

a: thermal diffusivity of the ground
q: heat flow on the surface of buried tube
$\lambda_s$: thermal conductivity of the soil
u: eigenvalue
$J_x$: the X root of the Bessel function of the first kind
$Y_x$: the X root of the Bessel function of the second kind where r is any radial distance from the buried tube 11, and the dimensionless temperature $T_S^*$ for a change in heat flow q by time is obtained by superposition principle of Duhamel's theorem.

Figure 4:
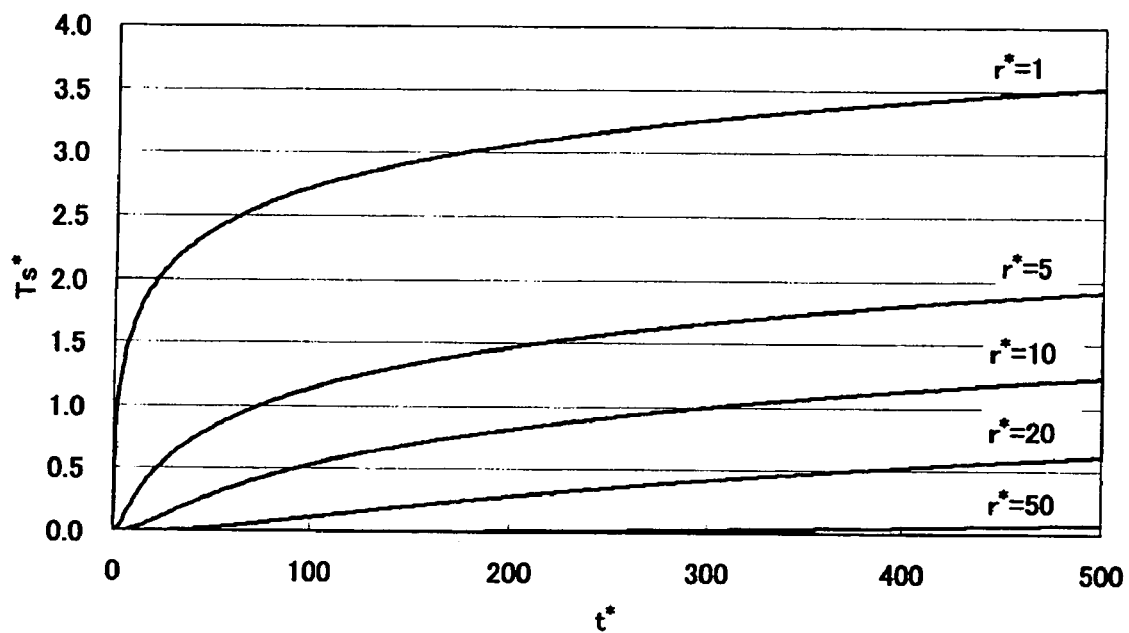
FIG. 4 is a graph of this embodiment illustrating a change in dimensionless temperature for a change in Fourier number.

FIG. 4 shows the changes in the dimensionless temperature $T_S^*$ for the changes in the Fourier number t* at the dimensionless distances r* of 1, 5, 10, 20 and 50. Here, the dimensionless distance r* is calculated by the dimensionless distance calculating means 311, using the following expression (1) stored as arithmetic expression data in the storage device 2.

$$r^* = \frac{r}{r_p} \qquad \text{expression (1)}$$

where
- $r_p$: radius of buried tube
- r: radial distance from buried tube

Figure 5:
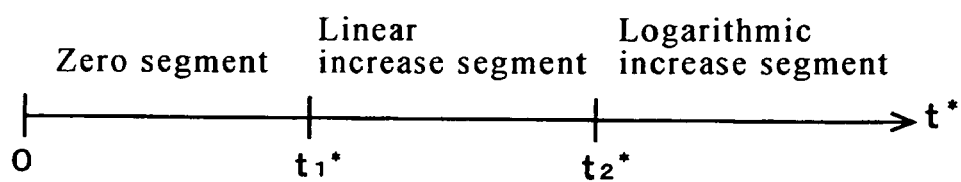
FIG. 5 is a diagram of this embodiment illustrating the relationship between each segment and a dimensionless time.

In FIG. 4, the curve for the dimensionless distance r*=1 shows the temperature response on the surface of the buried tube 11. Each curve indicates an almost linear increase in the dimensionless temperature $T_S^*$ when this temperature is smaller than 0.5. On the other hand, when the dimensionless temperature $T_S^*$ exceeds 0.5, all the curves show a logarithmic increase as well as the case of the dimensionless distance r*=1. When the Fourier number t* is small, no change in the dimensionless temperature $T_S^*$ at a large dimensionless distance r* is found. Thus, the underground temperature change for the distance between the buried tubes $r_d$ of this embodiment is calculated, as shown in FIG. 5, by dividing the range of the Fourier number t* into three segments: a zero segment in which the dimensionless temperature $T_S^*$ is 0, a linear increase segment in which the dimensionless temperature $T_S^*$ linearly increases, and a logarithmic increase segment in which the dimensionless temperature $T_S^*$ logarithmically increases.

By defining the Fourier number t* bounded by the zero segment and the linear increase segment as a first dimensionless time $t_1^*$, this first dimensionless time $t_1^*$ is calculated by the first dimensionless time calculating means 312. More specifically, the first dimensionless time calculating means 312 acquires the following approximate expression (4) stored as arithmetic expression data in the storage device 2, changes the dimensionless time t* for the dimensionless distance r* with the dimensionless temperature $T_S^*$ smaller than 0.5, and acquires the dimensionless time t* which shows the increase in the dimensionless temperature $T_S^*$ beginning at 0 as the first dimensionless time $t_1^*$.

$$T_s^* \cong 2.8\exp(-1.73 t^{*-0.51} r^*) \qquad \text{expression (4)}$$

By defining the Fourier number t* bounded by the linear increase segment and the logarithmic increase segment as a second dimensionless time $t_2^*$, this second dimensionless time $t_2^*$ is calculated by the second dimensionless time calculating means 313. In a more specific way, the second dimensionless time calculating means 313 acquires the following approximate expression (5) stored as arithmetic expression data in the storage device 2, changes the dimensionless time t*, and acquires, in an approximate manner, the dimensionless time t*, corresponding to the dimensionless temperature $T_S^*$=0.5, as the second dimensionless time $t_2^*$.

$$T_s^* \cong -\ln(r^*) + T_s^*|_{r^*=1} \qquad \text{expression (5)}$$

The second dimensionless time calculating means 313 of this embodiment, which acquires the dimensionless time t* with the dimensionless temperature $T_S^*$ of 0.5 as the second dimensionless time $t_2^*$, is not intended as a definition of the limits of the above description, but any value may be determined if it is found on the boundary area between the linear increase segment and the logarithmic increase segment, and the dimensionless temperature $T_S^*$ may range from 0.3 to 0.7.

After dividing the change in the dimensionless temperature $T_S^*$ into the above three segments based on the calculated first dimensionless time $t_1^*$ and the second dimensionless time $t_2^*$, the change in the dimensionless temperature $T_S^*$ in the zero segment, with no impact of heat flow therein on the temperature change to be considered, is given by the following approximate expression (8).

$$T_s^*|^{t1^*-0} \cong 0 \qquad \text{expression (8)}$$

The change in the dimensionless temperature $T_S^*$ in the linear increase segment, based on superposition of the Duhamel's theorem, is given by the following approximate expression (9).

$$T_s^* \Big|^{t_2^*-t_1^*} \cong \frac{0.5}{t_2^* - t_1^*} \int_{t_1^*}^{t_2^*} q\, dt^* \qquad \text{expression (9)}$$

The change in the dimensionless temperature $T_S^*$ in the logarithmic increase segment is given by the following approximate expression (10).

$$T_s^* \Big|^{t^*-t_2^*} \cong T_s^* \Big|_{r^*=1}^{t^*-t_2^*} \qquad \text{expression (10)}$$

From the above expressions (8) to (10), the change in the underground dimensionless temperature $T_S^*$ for a dimensionless time t* at the predetermined dimensionless distance r* is given by the following approximate expression (11).

$$T_s^* \cong T_s^*|^{t_2^*-t_1^*} + T_s^*|^{t^*-t_2^*} \qquad \text{expression (11)}$$

Based on the above expressions (8) to (11), the underground temperature change is given at any point for the distance between the buried tubes $r_d$. Specifically, the boundary time acquiring means 314 first acquires the elapsed time t corresponding to the first dimensionless time $t_1^*$ as a first boundary time t', and then acquires the elapsed time t corresponding to the second dimensionless time $t_2^*$ as a second boundary time t". The change in the underground temperature $T_S$ in the zero segment (t<t') is given by the following approximate expression (12).

$$T_s(r, t') = -\frac{2}{\pi \lambda_s} \int_0^{t'} q(t) I(r, t'-t)\, dt \cong 0 \qquad \text{expression (12)}$$

The change in the underground temperature $T_S$ in the linear increase segment (t'≦t<t") is given by the following approximate expression (13).

$$T_s(r, t'' - t') = -\frac{2}{\pi\lambda_s}\int_{t'}^{t''} q(t)I(r, t'' - t')dt \quad \text{expression (13)}$$

$$\cong -\frac{2}{\pi\lambda_s(t_2^* - t_1^*)}\int_{t_1^*}^{t_2^*} q\,dt^*$$

Moreover, the change in the underground temperature $T_S$ in the logarithmic increase segment ($t \geqq t''$) is given by the following approximate expression (14).

$$T_s(r, t - t'') = -\frac{2}{\pi\lambda_s}\int_{t''}^{t} q(t)I(r, t - t'')dt \quad \text{expression (14)}$$

$$\cong -\frac{2}{\pi\lambda_s r^{*2}}T_s^*\bigg|_{r^*=1}^{t^*-t_2^*}$$

From the above expressions (12) to (14), the underground temperature change calculating means 315 acquires the following approximate expression (3) stored as arithmetic expression data in the storage device 2, and calculates the change in the underground temperature $T_S$ at any point for the distance between the buried tubes $r_d$.

$$T_s(r, t) \cong T_s(r, t'' - t') + T_s(r, t' - t'') \quad \text{expression (3)}$$

$$\cong -\frac{2}{\pi\lambda_s(t_2^* - t_1^*)}\int_{t_1^*}^{t_2^*} q\,dt^* - \frac{2}{\pi\lambda_s r^{*2}}T_s^*\bigg|_{r^*=1}^{t^*-t_2^*}$$

Here, since the temperature change in an infinite solid like the soil can be regarded as linear, by using the superposition approach, the underground temperature $T_S$ on the surface of each buried tube 11 can be calculated in view of the impact of temperature change by other buried tubes 11. To be more specific, the tube surface temperature change calculating means 316, by the summation of changes in the underground temperature $T_S$ at any point for the distance between the buried tubes $r_d$ calculated by the underground temperature change calculating means 315, calculates changes in the underground temperature on the surface of each buried tube 11.

In this embodiment, to obtain more precise change in the underground temperature $T_S$, thermal resistance within a borehole, using a single U-shaped tube or double U-shaped tube heat exchanger, is calculated by boundary element method. The method for calculating thermal resistance will be described as follows with reference to the drawings.

Figure 6A:
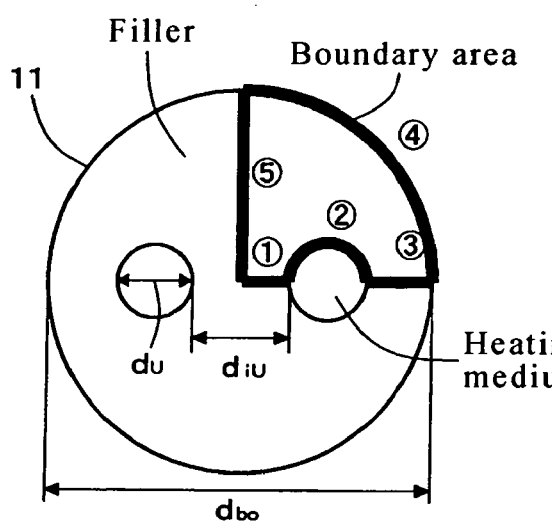
FIG. 6A is a sectional view of this embodiment illustrating a borehole for a single U-shaped tube heat exchanger.
Figure 6B:
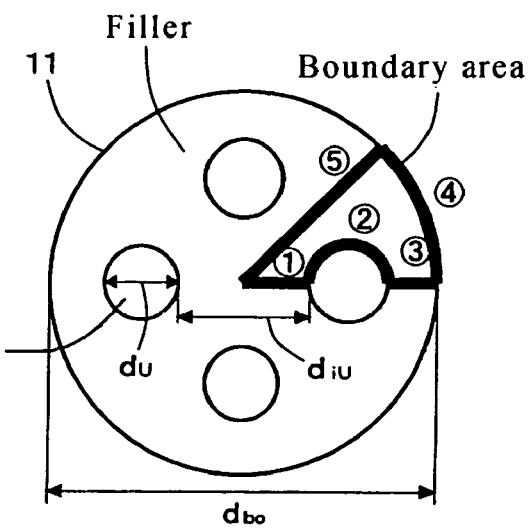
FIG. 6B is a sectional view of this embodiment illustrating a borehole for a double U-shaped tube heat exchanger.

FIG. 6A is a sectional view of a borehole using a single U-shaped tube heat exchanger, and FIG. 6B is a sectional view of a borehole using a double U-shaped tube heat exchanger. In this embodiment, the total calculation time will be reduced, by making smaller a calculating area in a boundary area, which is provided with an adiabatic boundary bounded by a symmetrical part thereof. More specifically, as shown in FIG. 6A and FIG. 6B, the boundary area is given by a part within a highlighted full line, in which numbered boundaries 1, 3 and 5 are provided with an adiabatic boundary and numbered boundaries 2 and 4 are provided with a potential boundary in a temperature potential field. Potential values for the boundaries 2 and 4 are set at 1 and 0, respectively, to generate heat transfer therebetween. In fact, this boundary condition of temperature difference of 1 allows for temperature change calculation, even in cases with various temperature differences. Under this boundary conditions, for the single U-shaped tube heat exchanger and the double U-shaped tube heat exchanger, the use of boundary element method obtains a heat flow q for the boundary 2 or 4 in the steady state by changing a U-shaped tube diameter $d_U$, a borehole diameter $d_{bo}$, a center distance between a flow pipe and a return pipe $d_{iU}$, respectively. From this heat flow q, thermal resistance value within the borehole is calculated. The calculation conditions are shown in FIG. 7.

Figure 9A:
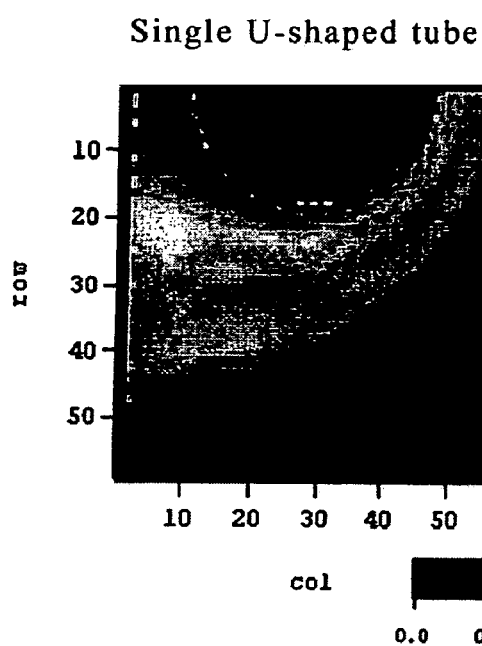
FIG. 9A is a contour figure for the single U-shaped tube heat exchanger of this embodiment.
Figure 9B:
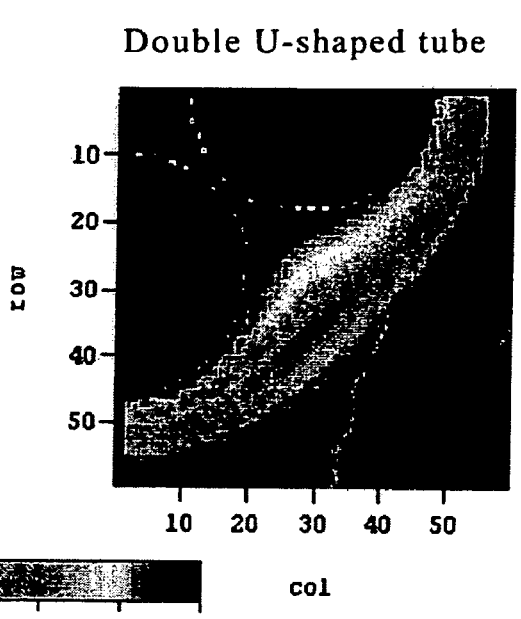
FIG. 9B is a contour figure for the double U-shaped tube heat exchanger of this embodiment.

On the assumption that a cement filler is used within the borehole, thermal conductivity is set at 1.8 W/ (m·K) in the calculation. The calculation results under the above calculation conditions are shown in FIG. 8. Under the calculation condition 1, an inner point temperature is calculated by a step of 1 mm whereby contour figures are prepared for the single U-shaped tube heat exchanger and the double U-shaped tube heat exchanger as shown in FIG. 9A and FIG. 9B, respectively. These contour figures demonstrate favorably simulated heat transfer within the borehole, thereby indicating reliable thermal resistance values within each U-shaped tube.

The calculation results in FIG. 8 show that a thermal resistance value within the borehole is smaller, as a distance between the periphery of the borehole and the periphery of each U-shaped tube becomes shorter. Thus, for the installation of U-shaped tube heat exchangers, by determining the diameter of the U-shaped tube larger relative to the diameter of a borehole and placing U-shaped tubes at a longer interval, thermal resistance within the borehole is reduced, resulting in more heat absorption by heat exchangers.

Next, considering that a thermal resistance value within the borehole as shown in FIG. 8 is calculated by length, a thermal resistance $R_{ub}$ of the U-shaped tube and the heating medium therein by length is given by the following expression (15).

$$R_{ub} = \frac{1}{\pi}\left(\frac{1}{d_{u1}h_b} + \frac{1}{\lambda_u}\ln\frac{d_{u2}}{d_{u1}}\right) \quad \text{expression (15)}$$

where $d_{u1}$ is inner diameter of U-shaped tube, $d_{u2}$ is outer diameter of U-shaped tube, $h_b$ is heat transfer coefficient for heating medium, $\lambda_u$ is thermal conductivity of U-shaped tube.

The summation of the thermal resistance $R_{bo}$ within the borehole and this obtained thermal resistance $R_{ub}$ leads to the calculation of thermal resistance for the part ranging from the heating medium to the surface of the borehole. Consequently, a coefficient of overall heat transmission $K_p$ by unit length for the above part for the single U-shaped tube heat exchangers or double U-shaped tube heat exchangers is given by the following expression (16).

$$K_p = \frac{1}{R_{ub} + R_{bo}} \quad \text{expression (16)}$$

A heat quantity $Q_p$ on the surface of a tube is given by the following expression (17).

$$Q_p = K_p A_p(T_s|_{r=r_p} - T_b) \quad \text{expression (17)}$$

Thus, a heat flow q generated on the surface of the tube is given by the following expression (6), as a number obtained by dividing the heat quantity $Q_p$ on the surface of a tube by a tube surface area $A_p$.

$$q = K_p(T_s|_{r=r_p} - T_b) \qquad \text{expression (6)}$$

where $$K_p = \frac{1}{R_{ub} + R_{bo}} \qquad R_{ub} = \frac{1}{\pi}\left(\frac{1}{d_{u1}h_b} + \frac{1}{\lambda_u}\ln\frac{d_{u2}}{d_{u1}}\right)$$

$T_s|_{r=r_p}$: underground temperature on the surface of buried pipe
$T_b$: temperature of heating medium
$R_{bo}$: thermal resistance within borehole
$d_{u1}$: inner diameter of U-shaped tube
$d_{u2}$: outer diameter of U-shaped tube
$h_b$: convective heat transfer coefficient of heating medium
$\lambda_u$: thermal conductivity of U-shaped tube Thus, when the underground temperature change calculating means 315 calculates the change in the underground temperature at any point for the distance $r_d$ between the buried tubes using the expression (3), this means can acquire more precise change in the underground temperature using the expression (6), considering properties of a U-shaped tube heat exchanger.

Next, the arithmetic part for system efficiency 32 calculates a coefficient of performance (COP) for the heat pump 13 in the ground source heat pump system 10 and a COP for the entire system. The COP for the heat pump 13 is obtained by dividing an output for the heat pump 13 by a power consumption for the heat pump 13. The COP for the entire system is calculated by dividing the output for the heat pump 13 by the sum of the power consumptions for the heat pump 13 and the circulating pump 12.

The arithmetic part for power consumption 33 calculates a power consumption for the ground source heat pump system 10 by dividing a thermal output of the indoor air conditioner 14 by the COP for the heat pump 13 calculated by the arithmetic part for system efficiency 32.

The arithmetic part for amount of carbon-dioxide emission 34 calculates an annual amount of carbon-dioxide emission discharged from the ground source heat pump system 10, by obtaining a power consumption calculated by the arithmetic part for power consumption 33 and by using a predetermined conversion factor. This embodiment employs a conversion factor of 0.48[kg–$CO_2$/kWh] by Hokkaido Electric Power Co., Inc.

The arithmetic part for running costs 35 calculates an annual running costs for the ground source heat pump system 10, based on prescribed electric utility rates, by obtaining the power consumption calculated by the arithmetic part for power consumption 33. To calculate costs, this embodiment uses the utility rates for snow-melting power by the Hokkaido Electric Power Co., Inc., 1,060 yen for 3-month service and 270 yen for other uses, with a metered rate of 7.67 yen.

The arithmetic part for life cycle 36 calculates a mean annual primary energy consumption, a mean annual amount of carbon-dioxide emission and a mean annual costs for the ground source heat pump system 10 during a certain period of time based on initial costs and equipment life.

Other components for this performance prediction system 1 will be described. The input device 4 comprises a keyboard and a mouse for entering the aforementioned data and command. The working memory 5 comprises random access memories (RAMs), which serve arithmetic processing for the arithmetic processing unit 3 and temporarily store data inputted from the input device 4. The output device 6, comprising, for example, a screen and a printer, displays and prints out calculation results.

Figure 10:
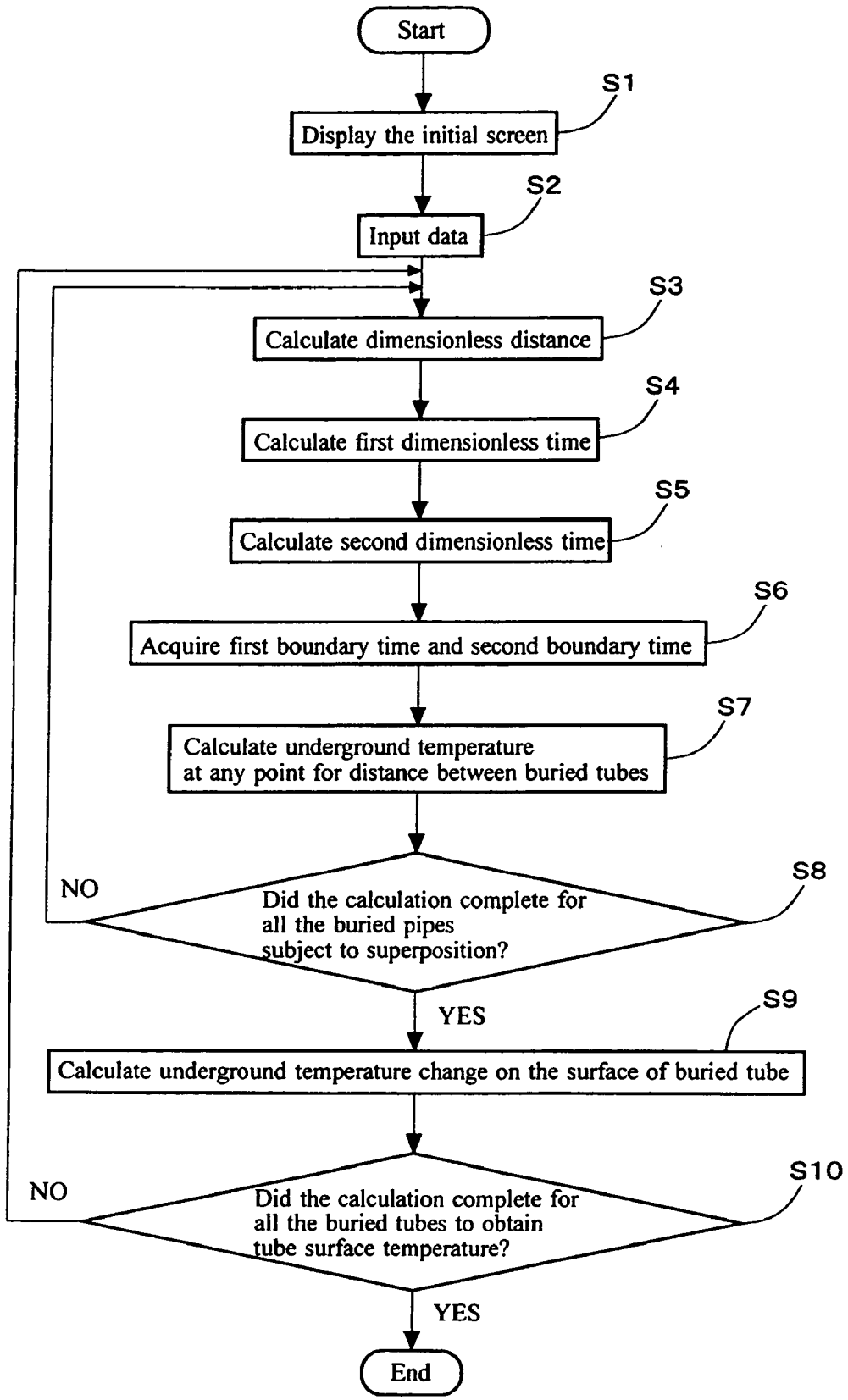
FIG. 10 is a flow chart showing the processing by the performance prediction program of this embodiment.

Subsequently, the operation of the performance prediction system 1 processed by the performance prediction program and the performance prediction method of this embodiment are described with reference to a flowchart in FIG. 10.

Figure 11:
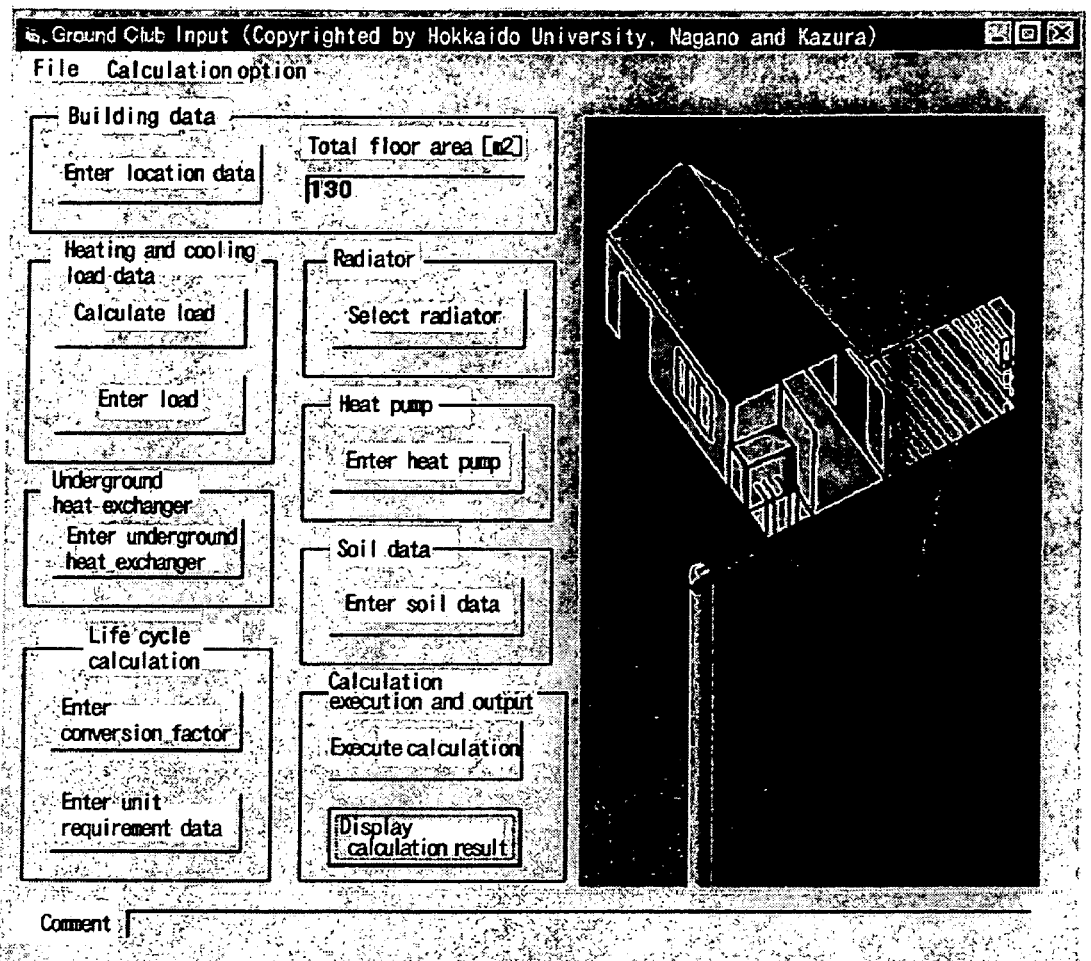
FIG. 11 is an image diagram showing the initial screen for the performance prediction program of this embodiment.
Figure 12:
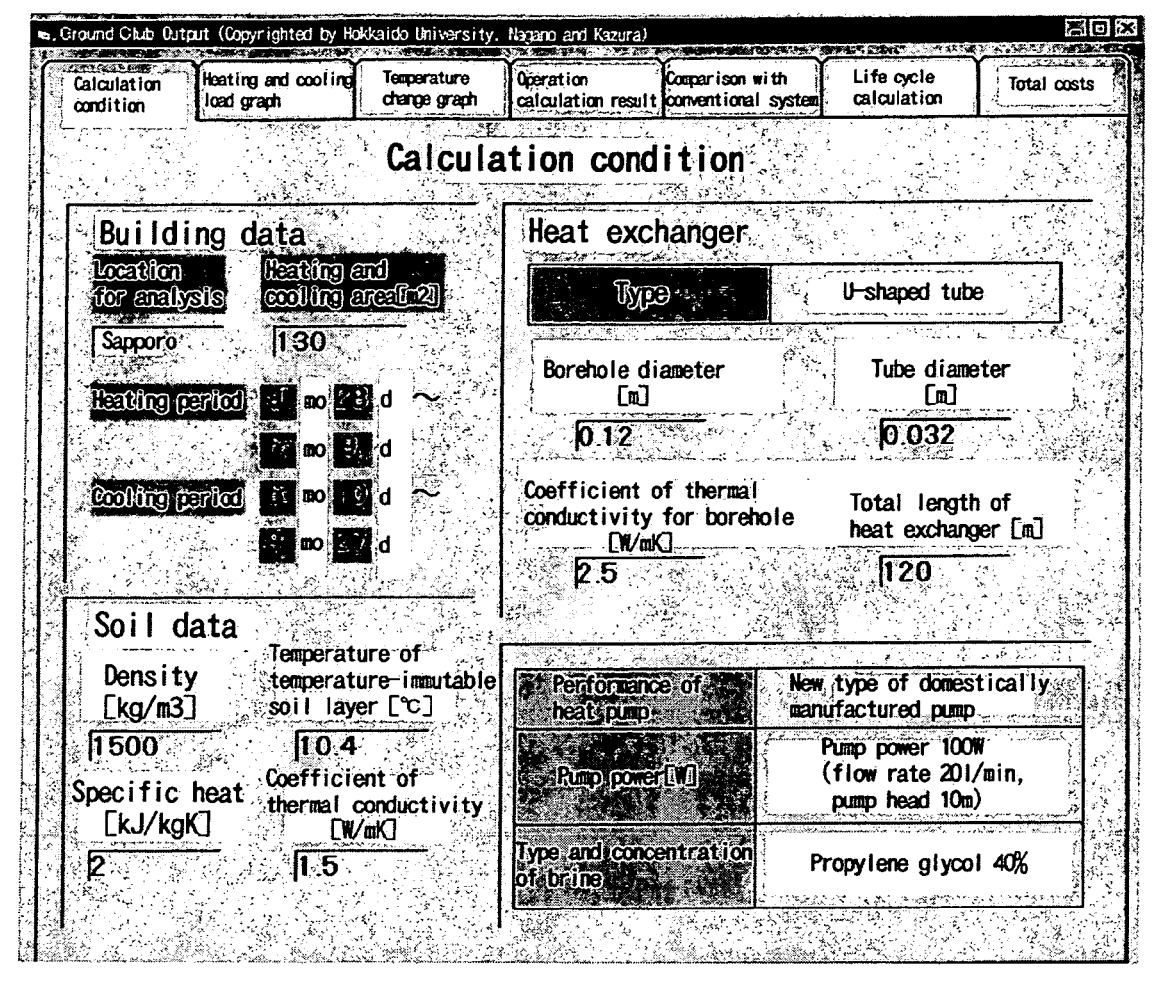

In the performance prediction system 1 of this embodiment which predicts the performance for the ground source heat pump system 10 having heat exchangers comprising a plurality of buried tubes 11, step S1, as shown in FIG. 11, first starts up the performance prediction program and displays the initial screen. Then, step S2 inputs data used for calculation, using the input device 4. In this embodiment, as shown in FIG. 12, building data, such as location for analysis, heating and cooling area, heating and cooling periods, and soil data, such as soil density, soil specific heat, temperature of temperature-immutable soil layer and thermal conductivity are inputted. In addition, heat exchanger data, like its type, diameter and thermal conductivity of borehole, diameter of heat exchanger tube and the total length of heat exchanger are inputted. As for the data with regard to the heat pump 13, performance and power of a heat pump, and type and concentration of brine are inputted. Other data like distance between the buried tubes ($r_d$), heat flow on the surface of the buried tube (q), the thermal conductivity of the soil ($\lambda$), the thermal diffusivity of the soil (a) are inputted, all of which are stored in the working memory 5.

Next, in step S3, the dimensionless distance calculating means 311 calculates the dimensionless distance r* by acquiring the arithmetic expression (1) from the storage device 2 and the radius of the buried tube $r_p$ and the distance between the buried tubes $r_d$ from the working memory 5. The first dimensionless time calculating means 312 in step S4 calculates the first dimensionless time $t_1$* for the dimensionless distance r* by acquiring the calculated dimensionless distance r* and the arithmetic expression (4) from the storage device 2. In step S5, the second dimensionless time calculating means 313 calculates the second dimensionless time $t_2$* for the dimensionless distance r*, by acquiring the calculated dimensionless distance r* and the arithmetic expression (5) from the storage device 2.

Subsequently, in step S6, the boundary time acquiring means 314 acquires the first dimensionless time $t_1$* and the second dimensionless time $t_2$* and the first boundary time t' and the second boundary time t" as elapsed time corresponding to these dimensionless times. The underground temperature change calculating means 315 in step S7 calculates the change in the underground temperature $T_S$ at any point for the distance between the buried tubes $r_d$ by acquiring the first boundary time t' and the second boundary time t" and acquiring the arithmetic expression (3) from the storage device 2. Step S8 confirms whether the calculation for all of the buried tubes 11 subject to superposition has been completed, and if so (step S8: YES), the process proceeds into step S9. But, if the calculation has not finished, the process will go back to the step S3 (step S8: NO) and repeat the previous processes until the calculation for all the buried tubes 11 completes.

In step S9, the tube surface temperature change calculating means 316 acquires the change in the underground temperature $T_S$ for all the buried tubes 11 calculated in the step S7, and calculates the change in the underground temperature $T_S$ on the surface of a given buried tube 11 by means of superposition principle to obtain the change in the underground temperature $T_S$ on the surface thereof. Step S10 confirms whether the calculation for all of the buried tubes 11 to calculate an underground temperature $T_S$ on the surface of the tube has been completed, and if so (step S10: YES), the calculation ends. But, if the calculation has not finished, the process will go back to the step S3 (step S10: NO) and repeat the previous process until the calculation for all the buried tubes 11 completes. From these processes, the changes in the underground temperature $T_S$ on the surface for all of the buried tubes 11 are calculated. This flowchart analysis can predict the performance for the ground source heat pump system, based on the calculated changes in the underground temperature $T_S$.

Next, specific examples of this embodiment will be described. In the following respective examples describing the ground source heat pump system 10 having heat exchangers comprising a plurality of buried tubes 11, a change in underground temperature $T_S$ on the surface of a tube for long-term heat absorption and discharge is calculated. Based on the results, the performance for the ground source heat pump system 10 is evaluated.

The calculation conditions in the examples are shown in FIG. 13. The calculation in the examples is based on the assumption that the buried tubes 11 are installed in Sapporo, a heavy snowfall city. The amount of heat absorption in winter and that of heat discharge in summer are set at 33 GJ and 3 GJ, respectively. The amounts of heat absorption and discharge are shown by month in FIG. 14, so that heating load (from October through May) and cooling load (from June through September) are distributed on a periodic basis throughout the year. The changes in the underground temperature $T_S$ by heat absorption and discharge using a plurality of the buried tubes 11 in a long-term observation of 60 years are simulated.

Figure 15:
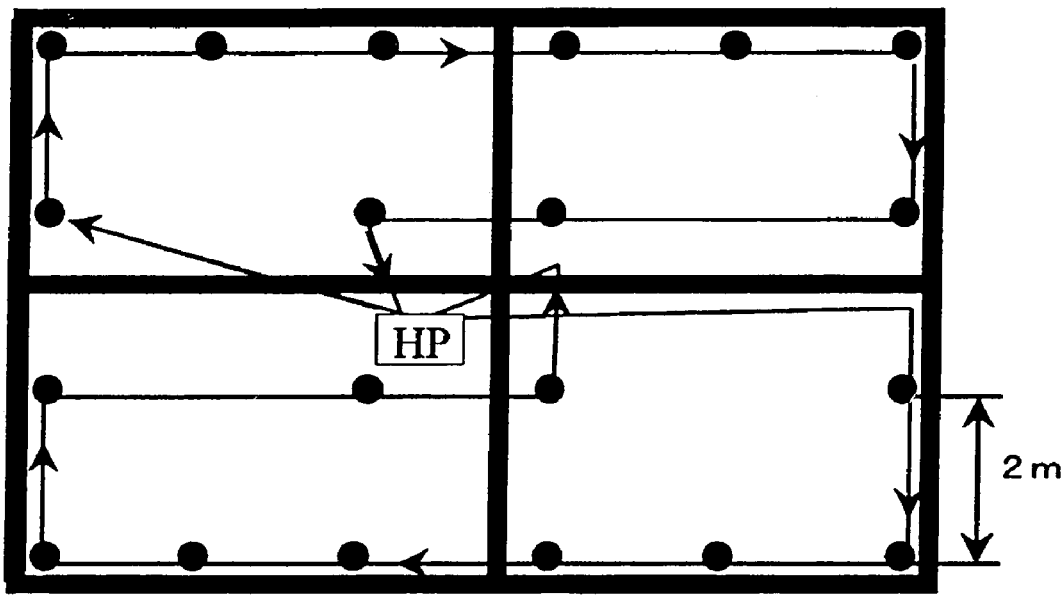
FIG. 15 is a diagram showing the alignment of a plurality of buried tubes for the examples 1 to 3.

In example 1, a heat exchanger model comprises twenty buried tubes 11, foundation pillars with a length of 8 m and an outer diameter of 0.175 m. The buried tubes 11 are aligned, as shown in FIG. 15, with an interval of 2 m. Under the calculation condition of this example 1, changes in mean underground temperature on the surface of a tube by month for the $1^{st}$, $2^{nd}$, $3^{rd}$ and $20^{th}$ years are shown in FIG. 16.

Figure 16:
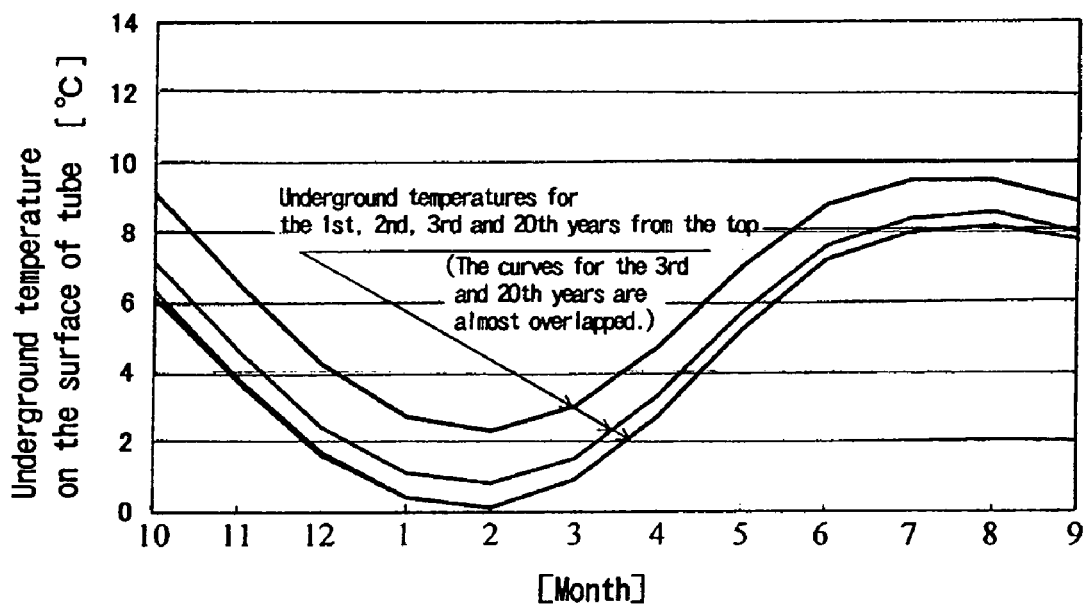
FIG. 16 is a graph showing a change in underground mean temperature on the surface of the buried tube for this example 1.

As shown in the FIG. 16, while a comparison of the underground temperature $T_S$ on the surface of the buried tube 11 for the $1^{st}$ year and those for the $2^{nd}$ and $3^{rd}$ years yields a temperature decline on a yearly basis, the curves for the $3^{rd}$ and $20^{th}$ years are almost identical. Thus, it is found that according to the condition of the example 1, the underground temperature is affected by heat absorption and discharge with the buried tube 11, and thereafter forms a cyclic pattern in a steady state in about three years. This is attributed to the equilibrium between the total amount of heat transferred at the upper and lower ends of the buried tubes and the total amount of heat absorption and discharge with the ground by the heat exchangers.

In example 2, a heat exchanger model comprises two single U-shaped tubes installed in a borehole with a length of 80 m and an outer diameter of 0.12 m. Under the calculation condition of this example 2, changes in mean underground temperature on the surface of a tube by month for the $1^{st}$, $2^{nd}$, $3^{rd}$ and $20^{th}$ years are shown in FIG. 17.

Figure 17:
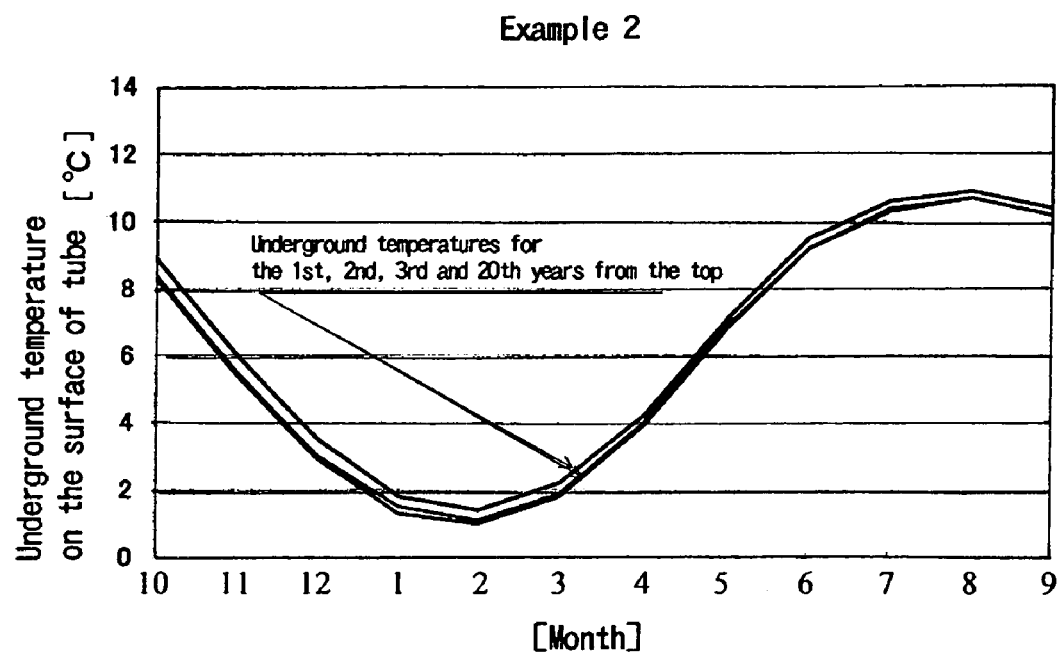
FIG. 17 is a graph showing a change in underground mean temperature on the surface of the buried tube for this example 2.

As shown in FIG. 17, the temperature curves for the $1^{st}$, $2^{nd}$, $3^{rd}$ and $20^{th}$ years are almost overlapped, causing no temperature decline on a yearly basis. This observation demonstrates that the use of one long buried tube 11 contributes to little decline in underground temperature $T_S$, even if a long-term heat absorption and discharge is found. This means that a single tube is characterized by a small variation in the underground temperature $T_S$ in a long-term observation due to a strong recovery of temperature of the soil infinitely existing around the buried tubes. On the other hand, if a plurality of buried tubes installed in the ground with a small interval have a significant difference between the amounts of heat absorption and discharge, the impact of heat absorption declines the underground temperature $T_S$ in the surrounding area, particularly for centrally-located buried tubes. The resulting no heat transfer from the ground further declines the underground temperature $T_S$, thereby generating a long-term increase or decrease in underground temperature.

Figure 18:
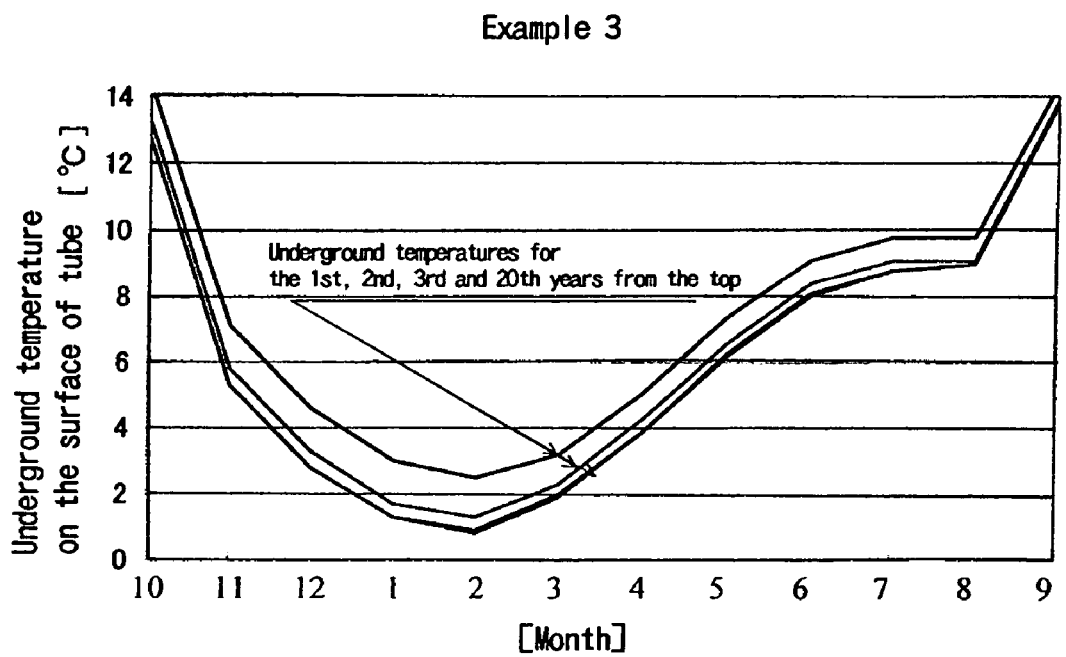
FIG. 18 is a graph showing a change in underground mean temperature on the surface of the buried tube for this example 3.

In example 3, a heat exchanger model considers heat discharge of 5 GJ in September in which the cooing period ends and also in October in which the heating period starts, along with the calculation condition of the example 1. Under the calculation condition of this example 3, changes in mean underground temperature on the surface of a tube by month for the $1^{st}$, $2^{nd}$, $3^{rd}$ and $20^{th}$ years are shown in FIG. 18.

The comparison of the results of this example 3 and those of the example 1 shows that the mean ground temperature on the surface of a tube in the example 3 during the heating period (from October through May) for the $20^{th}$ year is 2.2 degrees C. higher than in the example 1. This observation provides a new finding describing the inhibition of reduction in underground temperature, brine temperature and coefficient of performance (COP) for the heat pump 13 by heat discharge in summer. The methods for discharging heat into the ground are known to include the use of exhaust heat discharged from cooling equipment and solar collectors.

For the heat exchangers with a short length of 8 m in the aforementioned examples 1 and 3, a radius is corrected by the introduction of a correction factor due to a profound impact of heat transfer at both upper and lower ends of the buried pipes. More specifically, changes in the underground temperature $T_S$ on the surface of a tube generated by heat absorption and discharge of the actual heat exchanger, which are affected by heat transfer at both ends of buried pipes, are smaller than those for underground heat exchangers comprising infinite cylinders. Also, since the underground temperature change is smaller at a point farther away from the buried tube 11, providing a radius in consideration of a correction factor C for a smaller temperature change will give the same temperature change as the mean tube surface temperature for the actual heat exchangers. The correction factor C used in this example is calculated by the following approximate expression (18) by supposing that the end of the buried pipe on the side of the ground surface is provided with an insulation requirement.

$$C = 1.00 + 0.742\, L_n\, (1.103 t^{**} + 1.162) - 0.117 \qquad \text{expression (18)}$$

where $t^{**}$ is dimensionless number which is produced by multiplying the Fourier number $t^*$ by the square of $(r/L)$ and based on the length of the buried tube 11. r is radius of the buried tube, and L is the length of the buried tube.

According to the above descriptions, this embodiment can perform precise prediction of change in underground temperature at any point, which has not been achieved conventionally, by considering the use of a plurality of buried tubes installed in the ground, underground temperature change patterns for buried tubes placed at different intervals, and the use of U-shaped tube heat exchangers. Consequently, based on various conditions concerning the area and building for installing the ground source heat pump system 10 and soil properties, the diameter, length, number and layout for the buried tube 11 can be evaluated to improve short-term and long-term energy efficiency and cost effectiveness. Also, the impact of new technologies on the performance for the ground source heat pump system 10 can be estimated.

The performance prediction program and performance prediction system 1 for the ground source heat pump system of this invention is not intended as a definition of the limits of the above described embodiment, but may be modified accordingly. For example, the performance prediction program and performance prediction system 1 may be stored in one identical enclosure, or different enclosures according to respective functions. Moreover, calculating means such as the boundary time acquiring means 314 is not necessarily limited to the calculation using arithmetic expressions. For example, data tables may be prepared beforehand and stored in the storage device 2, from which data corresponding to a specific input value may be acquired.

What is claimed is:

1. A performance prediction program for a ground source heat pump system having a plurality of buried tubes as heat exchangers and a computer functioning by the program, wherein the computer comprises:

a dimensionless distance calculating means for calculating a dimensionless distance ($r^*$) by non-dimensionalizing a radial distance (r) from one of said plurality of buried tubes using the following expression (1);

$$r^* = \frac{r}{r_p} \qquad \text{expression (1)}$$

where $r_p$: radius of buried tube r: radial distance from buried tube a first dimensionless time calculating means for non-dimensionalizing the following expression (2) using a dimensionless time $t^*$ equal to $at/r_p$ and a dimensionless temperature $T^*$ equal to $\lambda T/(r_p \cdot q)$ when an underground temperature ($T_S$) for any distance (r) from a predetermined one of said plurality of buried tubes within an elapsed time (t) is given by said expression (2), and which calculates a first dimensionless time ($t_1^*$) bounded by a zero segment in which said dimensionless temperature shows no change for said dimensionless distance and a linear increase segment in which said dimensionless temperature linearly increases for said dimensionless time;

$$T_s(r, t) = \frac{2}{\pi \lambda_s} \int_0^t q(t) I(r, t) dt \qquad \text{expression (2)}$$

where $$I(r, t) = \int_0^\infty (1 - e^{-au^2 t}) \frac{J_0(ur) Y_1(u r_p) - Y_0(ur) J_1(u r_p)}{u^2 [J_1^2(u r_p) + Y_1^2(u r_p)]} du$$

a: thermal diffusivity of the ground q: heat flow on the surface of buried tube $\lambda_s$: thermal conductivity of the soil u: eigenvalue $J_x$: the X root of the Bessel function of the first kind $Y_x$: the X root of the Bessel function of the second kind a second dimensionless time calculating means for calculating a second dimensionless time ($t_2^*$) bounded by a logarithmic increase segment in which said dimensionless temperature for said dimensionless distance logarithmically increases and said linear increase segment;

a boundary time acquiring means for obtaining an elapsed time corresponding to said first dimensionless time as a first boundary time (t') and an elapsed time corresponding to said second dimensionless time as a second boundary time (t");

an underground temperature change calculating means for acquiring said first boundary time and said second boundary time, and for calculating an underground temperature change at any point for a distance between said plurality of buried tubes $r_d$ by the following approximate expression (3); and $$T_s(r, t) \cong T_s(r, t'' - t') + T_s(r, t' - t'') \qquad \text{expression (3)}$$

$$\cong -\frac{2}{\pi \lambda_s (t_2^* - t_1^*)} \int_{t_1^*}^{t_2^*} q \, dt^* - \frac{2}{\pi \lambda_s r^{*2}} T_s^* \bigg|_{r^*=1}^{t^* - t_2^*}$$

a tube surface temperature change calculating means for calculating an underground temperature change on a surface of said plurality of said buried tubes by a summation of said underground temperature changes for respective buried tubes.

2. The performance prediction program for the ground source heat pump system set forth in claim 1, wherein:

said first dimensionless time calculating means acquires said first dimensionless time based on the following approximate expression (4).

$$T_s^* \cong 2.8 \exp(-1.73 t^{*-0.51} r^*) \qquad \text{expression (4)}$$

3. The performance prediction program for the ground source heat pump system set forth in claim 1, wherein:

said second dimensionless time calculating means acquires said second dimensionless time in an approximate manner based on the following approximate expression (5).

$$T_s^* \cong -ln(r^*) + T_s^* \big|_{r^*=1} \qquad \text{expression (5)}$$

4. The performance prediction program for the ground source heat pump system set forth in claim 1, wherein:

a heat flow on the surface of one of said plurality of said buried tubes (q) is calculated based on the following expression (6) if said heat exchangers are U-shaped tube heat exchangers;

$$q = K_p(T_s|_{r=r_p} - T_b) \qquad \text{expression (6)}$$

where $$K_p = \frac{1}{R_{ub} + R_{bo}} \qquad R_{ub} = \frac{1}{\pi} \left( \frac{1}{d_{u1} h_b} + \frac{1}{\lambda_u} \ln \frac{d_{u2}}{d_{u1}} \right)$$

$T_s|_{r=r_p}$: underground temperature on the surface of buried pipe $T_b$: temperature of heating medium $R_{bo}$: thermal resistance within borehole $d_{u1}$: inner diameter of U-shaped tube $d_{u2}$: outer diameter of U-shaped tube $h_b$: convective heat transfer coefficient of heating medium $\lambda_u$: thermal conductivity of U-shaped tube.

5. A performance prediction system for a ground source heat pump system having a plurality of buried tubes as heat exchangers, comprising:

a dimensionless distance calculating means for calculating a dimensionless distance (r*) by non-dimensionalizing a radial distance (r) from one of said plurality of said buried tubes using the following expression (1);

$$r^* = \frac{r}{r_p} \qquad \text{expression (1)}$$

where $r_p$: radius of buried tube
r: radial distance from buried tube a first dimensionless time calculating means for non-dimensionalizing the following expression (2) using a dimensionless time t* equal to $at/r_p$ and a dimensionless temperature T* equal to $\lambda T/(r_p \cdot q)$ when an underground temperature ($T_s$) for any distance (r) from a predetermined one of said plurality of buried tubes within an elapsed time (t) is given by said expression (2), and which calculates a first dimensionless time ($t_1$*) bounded by a zero segment in which said dimensionless temperature shows no change for said dimensionless distance and a linear increase segment in which said dimensionless temperature linearly increases for said dimensionless time;

$$T_s(r, t) = -\frac{2}{\pi \lambda_s} \int_0^t q(t) I(r, t) \, dt \qquad \text{expression (2)}$$

where $$I(r, t) = \int_0^\infty \left(1 - e^{-au^2 t}\right) \frac{J_0(ur) Y_1(ur_p) - Y_0(ur) J_1(ur_p)}{u^2 [J_1^2(ur_p) + Y_1^2(ur_p)]} du$$

a: thermal diffusivity of the ground
q: heat flow on the surface of buried tube
$\lambda_s$: thermal conductivity of the soil
u: eigenvalue
$J_x$: the X root of the Bessel function of the first kind
$Y_x$: the X root of the Bessel function of the second kind a second dimensionless time calculating means for calculating a second dimensionless time ($t_2$*) bounded by a logarithmic increase segment in which said dimensionless temperature for said dimensionless distance logarithmically increases and said linear increase segment;

a boundary time acquiring means for obtaining an elapsed time corresponding to said first dimensionless time as a first boundary time (t') and an elapsed time corresponding to said second dimensionless time as a second boundary time (t");

an underground temperature change calculating means for acquiring said first boundary time and said second boundary time, and for calculating an underground temperature change at any point for a distance between said plurality of said buried tubes $r_d$ by the following approximate expression (3); and $$T_s(r, t) \cong T_s(r, t'' - t') + T_s(r, t' - t'') \qquad \text{expression (3)}$$

$$\cong -\frac{2}{\pi \lambda_s (t_2^* - t_1^*)}$$

$$\int_{t_1^*}^{t_2^*} q \, dt^* - \frac{2}{\pi \lambda_s r^{*2}} T_s^* \bigg|_{r^*=1}^{t^* - t_2^*}$$

a tube surface temperature change calculating means for calculating an underground temperature change on a surface of said plurality of said buried tubes by a summation of said underground temperature changes for each of said plurality of buried tubes.

6. The performance prediction system for the ground source heat pump system set forth in claim 5, wherein:

a heat flow on the surface of each of said plurality of said buried tubes (q) is calculated based on the following expression (6) if said heat exchangers are U-shaped tube heat exchangers;

$$q = K_p \left( T_s \big|_{r=r_p} - T_b \right) \qquad \text{expression (6)}$$

where $$K_p = \frac{1}{R_{ub} + R_{bo}} \qquad R_{ub} = \frac{1}{\pi} \left( \frac{1}{d_{u1} h_b} + \frac{1}{\lambda_u} \ln \frac{d_{u2}}{d_{u1}} \right)$$

$T_s|_{r=r_p}$: underground temperature on the surface of buried pipe
$T_b$: temperature of heating medium
$R_{bo}$: thermal resistance within borehole
$d_{u1}$: inner diameter of U-shaped tube
$d_{u2}$: outer diameter of U-shaped tube
$h_b$: convective heat transfer coefficient of heating medium
$\lambda_u$: thermal conductivity of U-shaped tube.

* * * * *